US009191240B2

(12) United States Patent
Krishnamoorthy

(10) Patent No.: US 9,191,240 B2
(45) Date of Patent: Nov. 17, 2015

(54) PROCESSING OF CHANNEL COEFFICIENTS OF A NETWORK

(71) Applicant: ST-Ericsson SA, Plan-les-Ouates (CH)

(72) Inventor: Aravindh Krishnamoorthy, Bangalore (IN)

(73) Assignee: ST-ERICSSON SA, Plan-les-Ouates (CH)

( * ) Notice: Subject to any disclaimer, the term of this patent is extended or adjusted under 35 U.S.C. 154(b) by 0 days.

(21) Appl. No.: 14/343,082

(22) PCT Filed: Oct. 2, 2012

(86) PCT No.: PCT/EP2012/069421
§ 371 (c)(1),
(2) Date: Mar. 6, 2014

(87) PCT Pub. No.: WO2013/050351
PCT Pub. Date: Apr. 11, 2013

(65) Prior Publication Data
US 2014/0328379 A1    Nov. 6, 2014

Related U.S. Application Data

(60) Provisional application No. 61/560,902, filed on Nov. 17, 2011.

(30) Foreign Application Priority Data

Oct. 4, 2011   (IN) .......................... 2877/DEL/2011

(51) Int. Cl.
*H04L 27/06*    (2006.01)
*H04L 1/00*     (2006.01)
(Continued)

(52) U.S. Cl.
CPC ........ *H04L 25/0212* (2013.01); *H04L 25/0224* (2013.01); *H04L 25/03006* (2013.01); *H04L 27/2695* (2013.01); *H04W 52/0209* (2013.01)

(58) Field of Classification Search
CPC .............. H04L 25/0224; H04L 25/025; H04L 25/0212; H04L 25/024; H04L 27/2695

USPC .......................... 375/285, 316, 340, 346, 350
See application file for complete search history.

(56) References Cited

U.S. PATENT DOCUMENTS

| | | | | |
|---|---|---|---|---|
| 8,077,805 | B1* | 12/2011 | Sarrigeorgidis | 375/316 |
| 2010/0322327 | A1* | 12/2010 | Caire et al. | 375/260 |
| 2012/0244817 | A1* | 9/2012 | Das et al. | 455/67.11 |

FOREIGN PATENT DOCUMENTS

| | | | |
|---|---|---|---|
| EP | 1 206 096 A2 | 5/2002 | |
| GB | 2 376 855 A | 12/2002 | |
| WO | WO 20130505351 | * | 4/2013 |

OTHER PUBLICATIONS

Ozeki, K., et al., "An Adaptive Filtering Algorithm Using an Orthogonal Projection to an Affine Subspace and Its Properties", NHK Technical Research Laboratories, Tokyo, Japan 167, Electronics and Communications in Japan, vol. 67-A, No. 5, 1984, pp. 19-27.*

(Continued)

*Primary Examiner* — Tesfaldet Bocure
(74) *Attorney, Agent, or Firm* — Patent Portfolio Builders PLLC

(57) ABSTRACT

The present subject matter discloses a system and a method for processing of channel coefficients of networks. In one embodiment, the method includes ascertaining at least one probable synchronization position of a received sequence and projecting, by oblique projection, at least one given noise basis vector spanning a given noise space onto the null space, so as to determine a channel impulse response at the at least one probable synchronization position. Based on a criterion related to the channel impulse response, a synchronization point for the received sequence is identified from the at least one probable synchronization position. The method also includes determining the noise contribution at the synchronization point and determining the noise coefficient of the at least one given noise basis vector based on the noise contribution so as to recover a signal substantially similar to the originally transmitted signal.

11 Claims, 3 Drawing Sheets

(51) Int. Cl.
*H04L 25/02* (2006.01)
*H04L 25/03* (2006.01)
*H04L 27/26* (2006.01)
*H04W 52/02* (2009.01)

(56) References Cited

OTHER PUBLICATIONS

International Search Report issued in corresponding International application No. PCT/EP2012/069421, date of mailing Mar. 14, 2013.
Written Opinion issued in corresponding International application No. PCT/EP2012/069421, date of mailing Mar. 14, 2013.
Yu, Xiang, et al., "Joint Channel and Symbol Estimation by Oblique Projections," IEEE Transactions on Signal Processing, IEEE Service Center, New York, NY, US, vol. 49, No. 12, Dec. 1, 2001, XP011059507, ISSN:1053-587X.
Alameda-Hernandez, Enrique, et al., "Frame/Training Sequence Sychronization and DC-Offset Removal for (Data-Dependent) Superimposed Training Based Channel Estimation," IEEE Transactions on Signal Processing, IEEE Service Center, New York, NY, US, vol. 55, No. 6, Jun. 1, 2007, pp. 2557-2569, XP011181909, ISSN: 1053-587X, DOI:10.1109/TSP.2007.893911.
Wang, Ping et al., "Joint Block Synchronization, Channel and DC-Offset Estimation of Data Dependent Superimposed Training (DDST) for MIMO System," Global Mobile Congress 2009, IEEE, Piscataway, NJ, USA, Oct. 12, 2009, pp. 1-6, XP031551176, ISBN: 978-1-4244-5302-3.

* cited by examiner

PROCESSING OF CHANNEL COEFFICIENTS OF A NETWORK

TECHNICAL FIELD

The present subject matter relates, in general, to processing of channel coefficients of a network and, in particular, to processing of channel coefficients of a network in communication devices.

BACKGROUND

Signals transmitted over a network traverse a medium, which is usually referred to as a channel, and are received by a receiver unit of a communication device, such as cellular phones, personal digital assistants, and portable computers. The transmitted signal and the received signal are usually not identical as the channel adds noise in the form of stray signals. Noise in the channel is generally due to distortions and interferences caused by operation of communication devices, environmental factors, etc. Further, the operations of various components, such as filters, clock circuits, oscillators and amplifiers, in the transmitting and receiving devices can add stray signals or noise to the transmitted signal.

The conventional method of recovering, from the received signal, an original signal that is substantially similar to the originally transmitted signal involves configuring the communication device to compute the various channel coefficients, also referred to as channel impulse response (CIR). The computation of CIR is a resource intensive process and consumes a high amount of processing power and electric power, thus reducing the battery life of the communication devices and adversely impacting the portability of the communication devices. Further, consumption of high processing power for the computation of CIR reduces the available processing power for running other applications on the communication device.

SUMMARY

This summary is provided to introduce concepts related to a method and a system for processing of channel coefficients of networks, in communication devices. The concepts are further described below in the detailed description. This summary is not intended to identify essential features of the claimed subject matter nor is it intended for use in determining or limiting the scope of the claimed subject matter.

In a first aspect, the method of processing of channel coefficients of networks, in communication devices, comprises ascertaining at least one probable synchronization position of a received sequence; and projecting, by oblique projection, basis vectors pertaining to a signal component of the received sequence onto the signal space, and at least one given noise basis vector, spanning a given noise space, onto the null space. The method further includes determining a channel impulse response at the at least one probable synchronization position and identifying a synchronization point for the received sequence from the at least one probable synchronization position. In one embodiment, the synchronization point is determined based on a criterion related to the channel impulse response. The method also includes determining the noise contribution at the synchronization point by removing the signal component from the received sequence; determining the noise coefficient of the at least one given noise basis vector at the synchronization point based on the noise contribution; and recovering a signal substantially similar to the originally transmitted signal by compensating for the at least one given noise basis vector based upon the determined noise coefficient.

In a second aspect, an arrangement for a communication device for processing of channel coefficients of networks is described. The arrangement comprises a synchronization module, which is configured to identify a synchronization point from one or more probable synchronization positions of a received signal, based, for example, on maximum signal energy. In one embodiment, the maximum signal energy is indicated by the channel impulse response of the channel, which the originally transmitted signal has traversed to reach the communication device. The arrangement further includes a channel estimator module configured to project, using oblique projection, at least one basis vector selected from basis vectors spanning a DC space and basis vectors spanning a spur space, into a null space of the received signal. The channel estimator module is also configured to determine the channel impulse response of the channel over which the received signal was received by the communication device based on the oblique projection.

BRIEF DESCRIPTION OF THE DRAWINGS

The detailed description is provided with reference to the accompanying figures. In the figures, the left-most digit(s) of a reference number identifies the figure in which the reference number first appears. The same numbers are used throughout the figures to reference like features and components. For simplicity and clarity of illustration, elements in the figures are not necessarily to scale. Some embodiments of devices and/or methods in accordance with embodiments of the present subject matter are now described, by way of example only, and with reference to the accompanying figures, in which.

DETAILED DESCRIPTION

Figure 1:
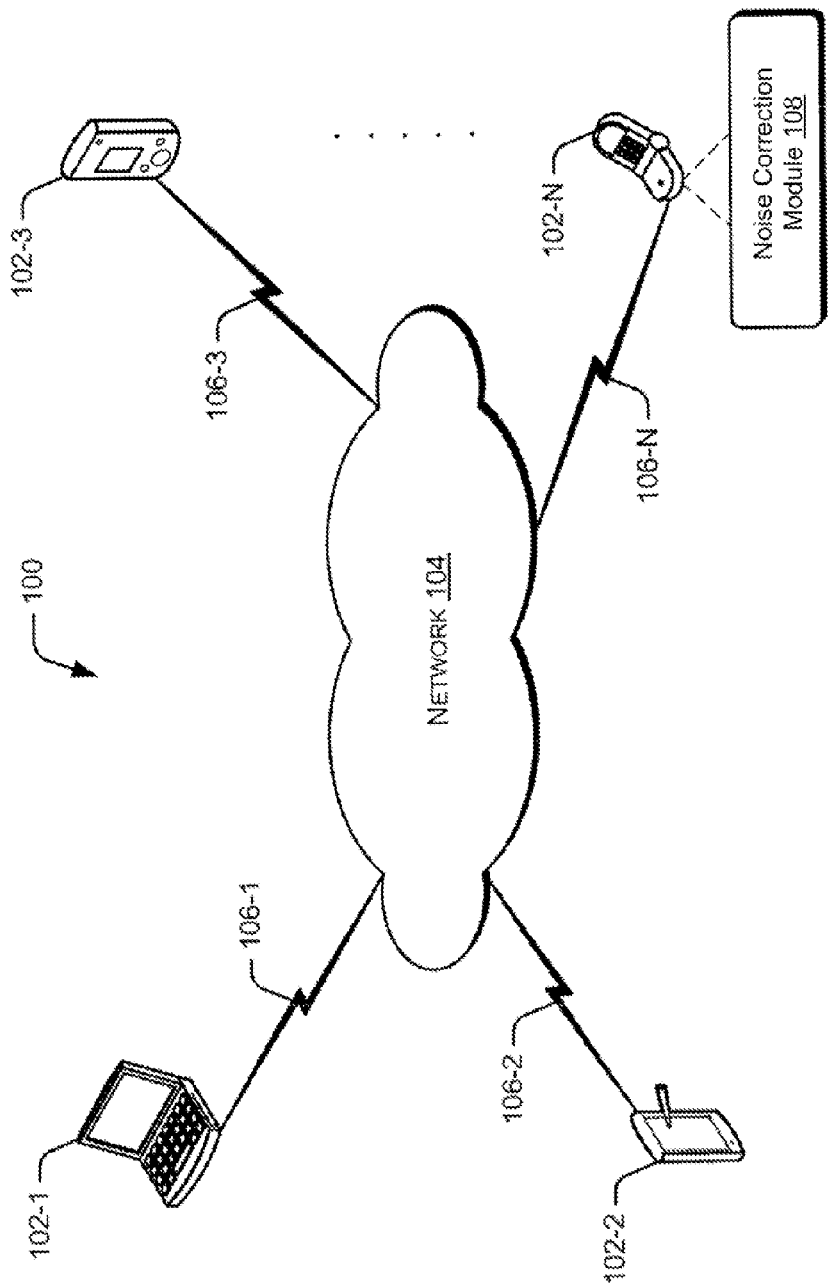
FIG. 1 illustrates a network environment implementing one or more communication devices for processing of channel coefficients, according to an embodiment of the present subject matter.

Systems and methods for processing of channel coefficients, of a network, in communication devices are described herein. The systems and methods can be implemented in a variety of communication devices. The communication devices that can implement the described method(s) include, but are not limited to, hand-held devices, laptops or other portable computers, mobile phones, personal digital assistants, global positioning system (GPS) tracking devices, and the like. Additionally, the method can be implemented in any of the communication networks, such as Global System for Mobile Communication (GSM) network, Enhanced Data rates for GSM Evolution (EDGE) network, Universal Mobile Telecommunications System (UMTS) network, Personal Communications Service (PCS) network, Time Division Multiple Access (TDMA) network, Code Division Multiple Access (CDMA) network, Next Generation Network (NGN), and IP-based network, Public Switched Telephone Network (PSTN), and Integrated Services Digital Network (ISDN). In particular, the systems and methods may be implemented in any network and/or in any communication device that uses least square estimation (LSE) technique for computation of channel coefficients. Although the description herein is with reference to certain communication networks, the systems and methods may be implemented in other communication networks and devices, albeit with a few variations, as will be understood by a person skilled in the art.

Typically, in a communication network, the data is transmitted in the form of signals using one or more transmitters of the communication network. The transmitted signals traverse a channel and are received by a receiver unit of a communication device. However, a transmitted signal, while traversing the channel, gets adversely affected by various channel parameters, such as stray signals, interference from other electronic devices, and environmental factors, such as lightning. Further, the received signals are also adversely affected by inter symbol interference (ISI) caused by multipath radio propagation and/or signal processing implemented at either or both the transmitter unit and the receiver unit. The above factors cause various distortions in the transmitted signals and hence the received signals are seldom identical to the transmitted signals. To recover, from the received signal, a signal that is substantially similar to the transmitted signal, channel coefficients need to be processed. While the following description discusses processing of channel coefficients in the presence of distortions corresponding to DC offset and spur, it will be understood by a person skilled in the art that any other noise, denoted by any given noise basis vectors, can also be handled in a similar manner.

For processing of channel coefficients, distortion of the transmitted signals is regarded as a characteristic property of the channel. Typically, the channel is modeled as a filter which causes the distortions in the transmitted signals. Further, the receiver unit of the communication device is configured to determine various channel coefficients, henceforth referred to as the channel impulse response (CIR), of the channel so as to undo the distortions caused by the channel and recover an original signal, which is substantially similar to the originally transmitted signals.

A typical receiver unit of a communication device may be classified either as a heterodyne receiver or homodyne receiver. In a heterodyne receiver, the received signal, which is usually a high frequency signal, is converted to a lower frequency signal. For this, the received signal is mixed with a locally generated signal, which is generated by a local oscillator of the heterodyne receiver. However, the complex and huge amount of circuitry required and the resultant high costs involved in the construction of the heterodyne receiver have limited the use of the heterodyne receiver.

Another conventionally known receiver, widely used in the receiver units of the communication devices, is the homodyne receiver, also known as a direct-conversion receiver (DCR) or zero-intermediate frequency (IF) receiver. The zero-IF receiver is configured to demodulate the received signal using synchronous detection, which is facilitated by a local oscillator of the zero-IF receiver. The local oscillator of the zero-IF receiver is configured to generate a local signal having a frequency that is substantially equal to the carrier signal frequency of the received signal. The zero-IF receiver requires only a single frequency conversion, which reduces the circuit complexity and the cost involved in construction of the zero-IF receiver, resulting in the wide use of the zero-IF receiver in communication devices. However, the zero-IF receiver has an inherent problem of introducing stray DC components in the received signal, which adversely affects the performance of the receiver unit of the communication device. The stray DC components, in addition to pure DC noise, may also include low frequency signals. The level of the stray DC components, henceforth referred to as magnitude of the DC offset, in the zero-IF receiver may sometimes be substantially higher than the strength of the received signals. Usually, well known DC offset compensation techniques are implemented by a digital signal processing (DSP) processor in the receiver unit to remove the stray DC components. Further, in both the categories of the receivers, the mixing of the received signal with the locally generated signal usually results in the enhancement of the DC offset.

Moreover, the circuitry of the conventionally used communication devices are usually implemented as a System on Chip (SOC), wherein the various components of the communication device are implemented in a single chip to conserve chip area and reduce cost of manufacturing the single chip. In such a case, the clock of one component of the communication device can adversely affect or leak into the clock of another component of the communication device. This results in addition of a noise into the received signal, which is referred to as spur and is usually in the form of tonal noise.

Further, it should be appreciated by those skilled in the art that the channel also introduces a delay in the received signal. The conventional receiver units are further configured to determine the origin of the received signal, referred to as a synchronization point, so as to enhance the accuracy of recovering the originally transmitted signal. The potential origins of the received signal are typically referred to as the potential synchronization positions. The conventional process of determining the synchronization point usually involves computing the signal energy, which is indicated by the CIR, at every potential synchronization position. Based on a pre-defined criterion, one of the potential synchronization positions is designated as the synchronization point. For example, in one implementation, the potential synchronization position having the maximum CIR may be designated as the synchronization point. This conventional process of determining the synchronization point is computationally intensive as the computation of CIR has to be repeated for every potential synchronization position.

The receiver units of the communication devices implement a conventionally known technique, the least square estimation method, to compute the CIR. The least square estimation method involves determining a curve or an equation of a curve, which best describes the relationship between an expected and an observed set of data by minimizing the summation of the squares of deviation between the observed and expected sets of data.

The received signal is generally modeled as a linear combination of a number, say N, of basis vectors. For example, the received signal may be represented as an N dimensional matrix which can be decomposed to generate N basis vectors. Further, the DC offset and the spurs are also represented by matrices which may or may not be of the same dimensions. For example, say $S_1$ represents the L column vectors that span the signal space, $D_m$ represents the M column vectors that span the DC offset space, and $P_k$ represents the K column vectors that span the spur space. Thus the basis vectors for the signal space are represented as $[S_0, S_1, S_2, \ldots S_{l-1}]$, the basis vectors for the DC offset space are represented as $[D_0, D_1, D_2, \ldots D_{m-1}]$ and the basis vectors for the spur space are represented as $[P_0, P_1, P_2, \ldots P_{k-1}]$. In the above example, the combined space matrix is represented as $A=[S_0, S_1, S_2, \ldots S_{l-1}, D_0, D_1, D_2, \ldots D_{m-1}, P P_0, P_1, P_2, \ldots P_{k-1}]$. Thus, A is a matrix which includes the l+m+k basis vectors of the signal space, the DC offset space and the spur space. In the above example, each of the basis vectors is considered to be linearly independent and thus matrix A is full column rank matrix.

It is well known that although the CIR is based mainly on the basis vectors of the signal space, the accuracy of the CIR computed is affected by the basis vectors of the DC offset space and the spur space since the basis vectors of the signal space are not always orthogonal to the basis vectors of the DC offset space and the spur space. In a first conventional technique of computing the CIR, along with the basis vectors of the signal space, the basis vectors of the DC offset space and the spur space are also considered during the computation of the CIR in order to increase the accuracy of the computation. In the first method, a lot of processing power is utilized in computing the noise coefficients of the DC offset and the spur basis vectors, which are not used for determining the CIR and the synchronization point. Hence, the first conventional method of computation of channel coefficients is processor intensive and uses a high amount of processing power of the communication device, thus reducing the battery life of the communication device as well as significantly reducing the processing power available for the running of the other applications of the communication device. In a second conventional approach, the basis vectors of the DC offset space and the basis vectors of the spur space are not considered for the determination of the CIR. However, since the CIR, DC offset and spur are not orthogonal, the second conventional method degrades the computational accuracy of the CIR, and hence the quality of the signal recovered from the received signal is low. Thus, ignoring the DC offset and the spur basis vectors results in the degradation in the accuracy of computation of the CIR.

The present subject matter discloses system and method of processing of channel coefficients, of a network, in communication devices. In one implementation, the method of computing the channel coefficients using oblique projection includes the joint estimation of the CIR, the DC offset and the spur of the received channel so as to determine an original signal, which is substantially similar to the originally transmitted signal. In the joint estimation, the CIR, the DC offset and the spur are computed simultaneously. The present subject matter is explained in greater detail in the context of a GSM network; however, the same should not be construed as a limitation. It would be well understood by those skilled in the art, that the present subject matter can be implemented in any wireless communication network.

In the GSM network, the data is transmitted in the form of bursts or frames. Each frame is further divided into timeslots such that each timeslot is used by a single communication device. The GSM network usually implements time division multiple access (TDMA), which is a channel access technique for networks in which the medium of propagation of transmitted signals is to be simultaneously shared by multiple communication devices. Thus, several communication devices are able to share the same channel by dividing the transmitted signal and/or the received signal into different time slots. The communication device transmits data in rapid succession only during the time slots allocated to the communication device. The computation of the CIR, DC offset and spur is typically done for every time slot allocated to the communication device.

As mentioned earlier, the received signal can be modeled as an N dimensional matrix, which can be decomposed to generate N basis vectors, wherein N is the summation of l, m and k. Further, the basis vectors for the signal space are represented as $[S_0, S_1, S_2, \ldots S_{l-1}]$, the basis vectors for the DC offset space are represented as $[D_0, D_1, D_2, \ldots D_{m-1}]$ and the basis vectors for the spur space are represented as $[P_0, P_1, P_2, \ldots P_{k-1}]$. Thus, the combined space matrix is represented as $A=[S_0, S_1, S_2, \ldots S_{l-1}, D_0, D_1, D_2, \ldots D_{m-1}, P_0, P_1, P_2, \ldots P_{k-1}]$. Hence, A is a matrix which includes the l+m+k basis vectors of signal space, DC offset space and spur space. Since each of the basis vectors is considered to be linearly independent, matrix A is full column rank matrix.

In one implementation, using oblique projection, the basis vectors depicting the DC offset component and the spur component are projected to a null space or in the orthogonal space, while the basis vectors depicting the signal components of the received signal are projected onto the signal space. In general, projection matrix refers to a matrix which is idempotent, i.e., which is equal to its own square. Hence, if M is a matrix and $M^2$ is equal to M, then matrix M is referred to as a projection matrix. Oblique projection matrices are projection matrices which do not have the property of Hermitian symmetry and hence are not orthogonal. By definition a Hermitian matrix is a square matrix with complex entries, such that the Hermitian matrix is equal to its conjugate transpose, i.e., a matrix M is said to have the property of Hermitian symmetry if $M^H=M$. On the other hand, a matrix M is said to be orthogonal if the transpose of the matrix M is equal to the inverse of the matrix M, i.e. $M^{-1}=M^T$. In general, oblique projection matrices are idempotent but not symmetrical.

Since the DC offset component and the spur component are projected to the null space, the determination of synchronization point involves determination of the channel coefficients or CIR at the potential synchronization positions on the basis of only the projected signal coefficients, but without ignoring the affect of the DC offset and the spur and, at the same time, without expending resources on computing the noise coefficients of the DC offset and spur basis vectors. After determining the synchronization point, the DC offset component and the spur component are determined at the synchronization point using conventional techniques. Thus, the coefficients for the DC offset and the spur basis vectors are determined only at the synchronization point and not at all potential synchronization positions. The DC offset component and the spur component are then removed from the received signal to further enhance the accuracy of determining an original signal, which is substantially similar to the originally transmitted signal.

The computational efficiency of the present subject matter is further illustrated by considering Y number of potential synchronization positions. As mentioned earlier, the combined space matrix A includes the l+m+k basis vectors. Hence, for the first conventional technique of determining the CIR described earlier, computation of the signal, the noise coefficients of the DC offset and the spur basis vectors would have involved Y times the summation of l, m and k inner products, i.e., Y(l+m+k) inner products, whereas the method as described in the present subject matter involves Yl+m+k inner products, thus reducing the computational intensity of computation of the CIR without compromising the accuracy in recovering the originally transmitted signal from the received signal. It should be appreciated by those skilled in the art that though the present method has been described with respect to the DC offset and the spur, any other noise, denoted by given noise basis vectors, can also be removed from the received signal using the described method.

Thus, the systems and methods of the present subject matter facilitate the recovery of a signal, which is substantially similar to the originally transmitted signals, from the received signal by joint estimation of the CIR, the DC offset and the spur using oblique projection. The systems and methods of the present subject matter significantly reduces the computational intensity involved in the computation of the CIR, the DC offset and the spur without compromising on the accuracy in recovering a signal, which is substantially similar to the originally transmitted signal, from the received signal. These and other advantages would be described in greater detail in conjunction with the following figures.

It should be noted that the description and figures merely illustrate the principles of the present subject matter. It will thus be appreciated that those skilled in the art will be able to devise various arrangements that, although not explicitly described or shown herein, embody the principles of the present subject matter and are included within its spirit and scope. Moreover, all statements herein reciting principles, aspects, and embodiments of the present subject matter, as well as specific examples thereof, are intended to encompass equivalents thereof.

It will be appreciated by those skilled in the art that the words during, while, and when as used herein are not exact terms that mean an action takes place instantly upon an initiating action but that there may be some small but reasonable delay, such as a propagation delay, between the initial action, and the reaction that is initiated by the initial action. Additionally, the word "connected" is used throughout for clarity of the description and can include either a direct connection or an indirect connection. The descriptions and details of well-known components are omitted for simplicity of the description.

FIG. 1 illustrates a network environment 100 implementing one or more communication devices 102 for processing of channel coefficients, according to an embodiment of the present subject matter. In one implementation, the network environment 100 includes one or more communication devices 102-1, 102-2, 102-3, . . . , 102-N (collectively referred to as communication devices 102) communicating with each other through a network 104. The communication devices 102 may include, without limitation, hand-held devices, laptops, tablets or other portable computers, smart phones, mobile phones, global positioning system (GPS) receivers, personal digital assistants (PDAs), and the like. Each of the communication devices 102 works on a communication protocol as defined by the network 104 to which the communication device 102 is coupled.

The network 104 may be a wireless or a wired network, or a combination thereof. The network 104 can be a collection of individual networks, interconnected with each other and functioning as a single large network. Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). Depending on the technology, the network 104 includes various network entities, such as base stations, mobile switching centers, transmission towers, gateways, routers; as would be apparent to a person skilled in the art, and such details have been omitted for brevity.

In operation, the network signals, 106-1, 106-2, 106-3, . . . , 106-N, collectively referred to as the originally transmitted signals 106, are transmitted over a medium, usually referred to as a channel, such as air, a wire, a waveguide, an optical fiber, or a wireless link, and are received by the communication devices 102. While traversing the channel, the originally transmitted signals 106 undergo various changes in their properties, such as phase, frequency, and amplitude, due to noises present in the channel. In general, the channel can be considered as acting as a filter. Thus, during the transmission of the originally transmitted signals 106 through the channel, the originally transmitted signals 106 can be distorted due to difference in the magnitude of attenuation and phase shift suffered by different frequency components of the originally transmitted signals 106. For example, the originally transmitted signals 106 may comprise a first signal having a first frequency F1 and a second signal having a second frequency F2. In one case, it may occur that the first signal having the first frequency F1 suffers an attenuation of two decibels (dBs) and the second signal having the second frequency F2 suffers an attenuation of three decibels (dBs). Further, noise may also be added to the originally transmitted signals 106 during the transmission of the originally transmitted signals 106 through the channel. As would be known to those skilled in the art, noise can be of random type and unpredictable.

Noises in the channel may be due to various factors such as interferences, distortions caused due to the presence and operation of multiple communication devices 102, faulty electrical equipments; automobile ignition radiation; fluorescent light, lightning, solar and intergalactic radiation; thermal motion of electrons in conductors; random emission, diffusion and recombination of charged carriers in electronic devices. Conventionally, Additive White Gaussian Noise (AWGN) model is used to model background noise in a channel. In an AWGN channel, the primary cause of distortion of originally transmitted signals 106 is due to linear addition of wideband or white noise with a constant spectral density and a Gaussian distribution of amplitude. Further, other causes of distortions in the originally transmitted signals 106 are fading, frequency selectivity, interference, non-linearity or dispersion. Also it would be well known to those skilled in the art that the characteristics of the channel, over which the originally transmitted signals 106 would be transmitted, may change with time. For example, a user using the communication device 102 may be traveling in a vehicle and hence the channel over which the originally transmitted signals 106 are traversing may be different at different locations and at different times. This causes the received signals by the communication devices 102 to have amplitude variations.

Moreover, the originally transmitted signals 106 can have multiple paths of propagation to reach the communication device 102. For example, a first path may be indicated by the line of sight, a second path may be due to reflection at an obstacle such as a building, and so on. Due to multiple paths of propagation, various images of the originally transmitted signals 106 reach the communication devices 102, each image having a different induced delay. Further, it is also possible that all the images of the originally transmitted signals 106 reaching the communication device 102 have an induced delay. The above mentioned situation occurs, for example, when the path of propagation indicated by the line of sight is blocked by one or more obstacles. The communication devices 102 are configured to model the channel as a filter and estimate the filter coefficients of the modeled filter, henceforth referred to as the channel impulse response (CIR), so as to ascertain the effect of the channel on the originally transmitted signals 106.

In one implementation, the communication device 102 may be configured to determine the origin or the source of the received signals, also referred to as the synchronization point, so as to enhance the accuracy of recovering the originally transmitted signal 106 from the received signal. The communication device 102 may be further configured to ascertain the potential origins of the received signal, referred to as the potential synchronization positions. The determination of the synchronization point is based on a criterion, such as maximum signal energy or minimum noise contribution, and involves computing the signal energy, indicated by the CIR, at every potential synchronization position. The communication device 102 may be further configured to designate the potential synchronization position having the maximum CIR as the synchronization point.

Moreover, if the circuitry of the communication device 102 is implemented as a System on Chip (SOC) so as to conserve chip area and reduce cost of manufacturing the single chip, leakage of clock signals can result in addition of tonal noise, referred to as spur. Further, the receiver unit, specially the zero-IF receiver, of the communication device 102 may also introduce stray DC components or DC offset in the received signal. Thus, for enhancing the accuracy of regeneration of the originally transmitted signal 106, the communication device 102 is configured to compensate for the effect of DC offset, the spur and other known noise signals, collectively referred to as noise contribution.

In one implementation, the communication device 102 is configured to model the received signal as an N dimensional matrix which can be decomposed to generate N basis vectors. As mentioned earlier, the basis vectors for the signal space are represented as $[S_0, S_1, S_2, \ldots S_{l-1}]$, the basis vectors for the DC space are represented as $[D_0, D_1, D_2, \ldots D_{m-1}]$ and the basis vectors for the spur space are represented as $[P_0, P_1, P_2, \ldots P_{k-1}]$. Thus, the combined space matrix is represented as $A=[S_0, S_1, S_2, \ldots S_{l-1}, D_0, D_1, D_2, \ldots D_{m-1}, P_0, P_1, P_2, \ldots P_{k-1}]$. Thus, A is a matrix which includes the N=l+m+k basis vectors of signal space, DC space and spur space. Since each of the basis vectors is considered to be linearly independent, matrix A is a full column rank matrix. In one implementation, using oblique projection, the DC offset component and the spur component can be projected to a null space i.e. in the orthogonal space. In the above example, the oblique projection P would be calculated as follows.

$$P = A\Omega(A^H A)^{-1} A^H$$

In the above Equation, $A^H$ denotes the Hermatian transformation of the matrix A and $\Omega$ is a matrix of dimensions (l+m+k) by (l+m+k), having '1' along the first l diagonal elements and '0' elsewhere. Thus the matrix used to compute the CIR is represented by $A^+$ wherein $A^+$ is equal to $\Omega(A^H A)^{-1} A^H$. Since the DC offset component and the spur component are projected to the null space, the determination of synchronization point involves determination of the CIR based on only the projected signal space basis vectors at the potential synchronization positions. Thus, even though the matrix $A^+$ has (l+m+k) rows, only the first l rows are non-zero and the lower m+k rows are zero. Hence the computation of CIR involves only l inner products.

For example, say at a potential synchronization position, the communication device 102 receives a received signal represented by a matrix r, wherein the matrix r is a column vector of the received signal. It should be appreciated by those skilled in the art, that the same concepts are also applicable for the communication devices 102 classified as single input multiple output (SIMO) or multiple input multiple output (MIMO) receivers. The SIMO receivers or the MIMO receivers receive multiple branches of the received signal, wherein each branch of the received signal would be associated with a column vector. Thus the received signals of the SIMO receivers or the MIMO are represented by multiple column vectors. The concepts of the present subject matter may be extended to the SIMO or MIMO receivers, albeit with modifications as will be understood by those skilled in the art.

The CIR for the potential synchronization position is represented by $\tilde{h}$, wherein $\tilde{h}$ is equal to $A^+ r$. Further, as mentioned earlier, the communication device 102 is configured to designate the potential synchronization position, for example, where the signal energy indicated by the CIR is the maximum, as the synchronization point.

In one embodiment, the communication device 102 includes a noise correction module 108, henceforth referred to as NCM 108, configured to remove the noise contribution from the received signal so as to recover a signal substantially similar to the originally transmitted signal 106. For example, if r denotes the received sequence of signals, the CIR $\tilde{h}$ is given by Equation 1, and the NCM 108 may be configured to determine the noise contribution, referred to as n, in accordance with Equation 2.

$$\tilde{h} = A^+ r \quad \text{(Equation 1)}$$

$$n = r - A\tilde{h} \quad \text{(Equation 2)}$$

In said implementation, the NCM 108 may be further configured to compute the noise coefficients of the basis vectors of the elements of the noise contribution, such as DC offset and the spur. In one example, the noise space matrix is denoted as matrix $B=[D_0, D_1, D_2, \ldots D_{m-1}, P_0, P_1, P_2, \ldots P_{k-1}]$ that includes the m basis vectors of DC offset and k basis vectors of spur. For this, the NCM 108 may be configured to determine the m basis vectors of the DC offset and the k basis vectors of the spur by methods known in the art. Further, in one implementation, the NCM 108 computes a matrix h, which represents the noise coefficients of the basis vectors of the DC offset and spur, in accordance with Equation 3 given below.

$$h = (B^H B)^{-1} B^H n \quad \text{(Equation 3)}$$

Thus, the NCM 108 determines the first m signal parameters of the matrix h as the noise coefficients of the DC offset basis vectors and the remaining k signal parameters of the matrix h as the noise coefficients of the spur basis vectors. The NCM 108 is further configured to remove the noise contribution, n, in the received signal using the determined noise coefficients of the basis vectors of the DC offset and spur so as to recover a signal, r', which is substantially similar to the originally transmitted signal. The recovered signal r' may be computed as shown in Equation 4 given below.

$$r' = r - \sum_{i=0}^{m-1} h_i D_i - \sum_{i=0}^{k-1} h_{m+i} P_i \quad \text{(Equation 4)}$$

As shown above in Equation 4, each of the basis vectors representing the noise contribution, for example, the basis vectors representing the DC offset and the spur, has an associated weightage represented by the associated co-efficient, $h_i$, of the basis vector. Thus, based on Equation 4, the NCM 108 can remove the affect of the DC offset and the spur from the received signal and enhance the accuracy of the recovery of the originally transmitted signal 106. Hence the communication device 102 facilitates the recovery of the originally transmitted signal 106 from the received signal by joint estimation of the CIR, the DC offset and the spur using oblique projection. The communication device 102 can reduce the computational intensity involved in the computation of the CIR, the DC offset and the spur with minimal affect on the accuracy in recovering the originally transmitted signal 106 from the received signal. Thus, it can enhance the battery life of the communication device 102 and the processing power available for running other application and utility tools on the communication device 102.

Figure 2:
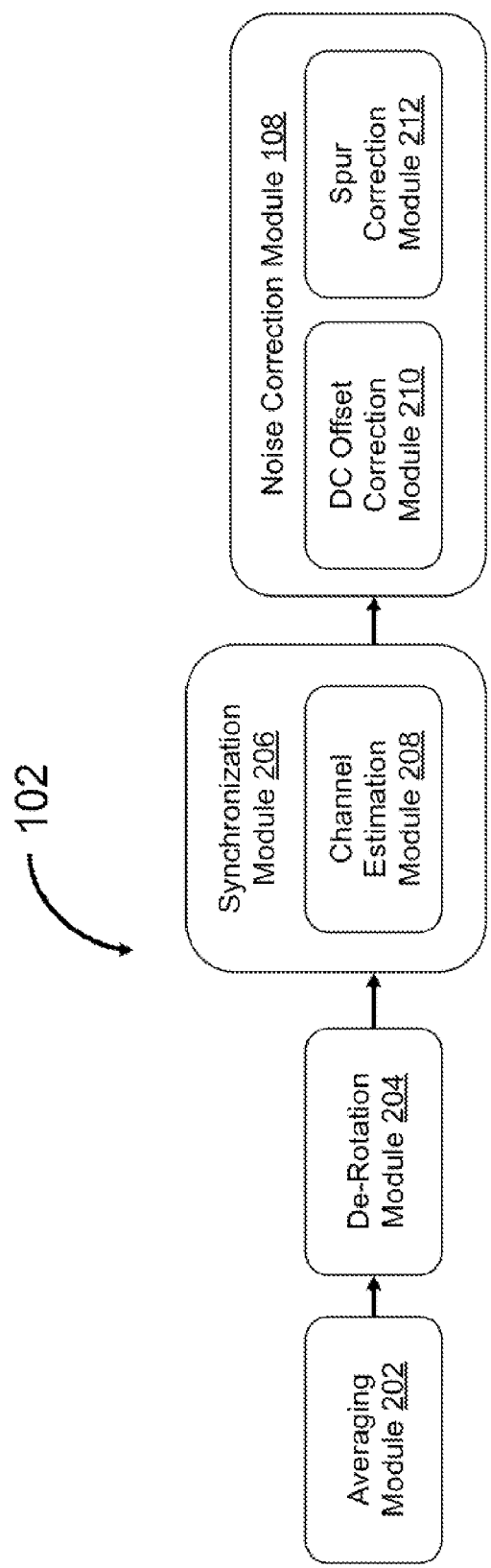
FIG. 2 illustrates a communication device, according to an embodiment of the present subject matter.

FIG. 2 illustrates an exemplary communication device 102 for processing of channel coefficients in the network 104. As is well known, any network 104, such as a GSM network, includes a plurality of mobile stations, such as communication devices 102 for connecting to the network 104. As is conventionally known, for communicating with each other, each of the communication devices 102 its respective base transceiver stations (not shown in the figure), which provide radio coverage within a cellular cell. Multiple base transceiver stations connect to a base station controller (not shown in the figure), which provides local switching to effect handover between the base stations. The base station controller is further connected to a mobile switching center (MSC), which is responsible for call handling of subscribers of the network 104.

In one implementation, the communication device 102 includes a processor (not shown in figure) and a memory (not shown in figure) coupled to the processor. The processor can be a single processing unit or a number of units, all of which could include multiple computing units. The processor may be implemented as one or more microprocessors, microcomputers, microcontrollers, digital signal processors, central processing units, state machines, logic circuitries, and/or any devices that manipulate signals based on operational instructions. Among other capabilities, the processor is configured to fetch and execute computer-readable instructions stored in the memory. The memory may include any computer-readable medium known in the art including, for example, volatile memory such as SRAMs and DRAMs and/or non-volatile memory such as EPROMs and flash memories. In one implementation, the memory includes modules and data.

The modules include routines, programs, objects, components, data structures, etc., which perform particular tasks or implement particular abstract data types. The modules may also be implemented as, signal processor(s), state machines, logic circuitries, and/or any devices or components that manipulate signals based on operational instructions. In one embodiment, the communication device includes an averaging module 202, henceforth referred to as the AM 202, a de-rotation module 204 henceforth referred to as the DRM 204, a synchronization module 206, henceforth referred to as the SM 206, a channel estimation module 208, henceforth referred to as the CEM 208 and the NCM 108. In said embodiment, the SM 206 includes the CEM 208. Further, the NCM 108 includes a DC offset correction module 210, henceforth referred to as the DC OCM 210 and a spur correction module 212, henceforth referred to as the SCM 212. Further the modules may also include other module(s). The other module(s) may include programs or coded instructions, such as operating systems, that supplement applications and functions of the communication device 102. Further, the above modules may be arranged to form any suitable arrangement which may be used in various electronic devices such as the communication device 102.

In said embodiment, the client device 102 can include a data module which, amongst other things, serves as a repository for storing data processed, received, associated and generated by one or more of the modules. The data module also includes temporary information generated as a result of the execution of one or more modules.

In operation, the originally transmitted signal 106, transmitted over the channel, is received as received signal by the communication device 102. As mentioned earlier, the received signal and the originally transmitted signal 106 are seldom identical. Hence, the communication device 102 is configured to recover a signal, which is substantially identical to the originally transmitted signals 106, from the received signals. In one implementation, the AM 202 is configured to remove a portion of the DC offset, a component of the noise contribution present in the received signal, from the received signal. In one implementation the AM 202 is configured to average the received signal and subtract the average from the received signal so as to remove a portion of the DC offset. However, the AM 202 is generally not able to completely eliminate the DC offset and some amount of residual DC offset remains in the received signal.

Further a phase shift may be introduced in the originally transmitted signal 106 based on the modulation technique used. This phase shift is also known as rotation and is usually represented as a rotation by an angle $\alpha$, i.e., by a factor $\exp(j\alpha)$ where j is a complex indicator. In said implementation, the DRM 204 is configured to de-rotate the received signal by a predetermined angle, based on the modulation technique used.

For example, in Enhanced Data rate for GSM Evolution (EDGE) the originally transmitted signal 106 is modulated using $3\pi/8$–8 phase shift keying (PSK). In the basic 8PSK graphical representation, there are 8 equidistant points on the unit circle. Thus, the symbols in the originally transmitted signal 106, represented by Ts, can assume eight possible values, $Ts=\exp(j \cdot m \cdot \pi/4)$, wherein exp indicated the exponential function and m is an integer from '0' to '7'. In the above case, the $3-\pi/8$ phase shift indicates that the symbols of the originally transmitted signal 106 a $3\pi/8$ rotating value. Hence the originally transmitted signal 106 after rotation can be represented by $Trs=Ts \cdot \exp \cdot (j \cdot m \cdot 3\pi/8)$, where m is the sample index On receiving the received signal, the DRM module 204 is configured to de-rotate the received signal by the angle $\alpha$. In the above example, i.e. in EDGE, the symbols of the received signal are de-rotated by $\exp(j \cdot m \cdot 3\pi/8)$ to compensate for the rotation or phase shift in the received signal.

After de-rotation, the SM 206 is configured to determine probable synchronization positions for the received signal. In one implementation, the SM 206 can be configured to ascertain the synchronization point from the probable synchronization positions, based on a criterion. For example, the SM 206 may be configured to designate the probable synchronization position where the magnitude of the signal energy, indicated by the CIR, is maximum as the synchronization point. In said implementation, the CEM 208 is configured to determine the CIR of the received signal at each of the probable synchronization positions.

In one implementation, the CEM 208 is configured to use oblique projection to project the basis vectors depicting the DC offset components and the spur components to a null space, i.e., in the orthogonal space and the basis vectors depicting the signal components to a signal space. Since, the basis vectors depicting the DC offset components and the spur components are projected to the null space, the determination of synchronization point by the CEM 208 involves determination of the CIR based on only the basis vectors depicting the projected signal space components at the potential synchronization positions. For example, if there are Y number of potential synchronization points, the number of computations involved in determining the CIR without ignoring the effect of the DC offset and the spur, but without computing the DC offset and spur coefficients, would be Yl+m+k inner products. Thus, the computational intensity of computation of the CIR is considerably reduced.

On determining the synchronization point, the received signal is processed by the NCM 108, which can be configured to remove the noise contribution from the received signal so as to recover the originally transmitted signal 106. In one implementation, the NCM 108 computes the noise coefficients of the basis vectors of the components of the noise contribution, for example the basis vectors of the DC offset and the spur. As mentioned earlier, the NCM 108 computes the matrix $B=[D_0, D_1, D_2, \ldots D_{m-1}, P_0, P_1, P_2, \ldots P_{k-1}]$. In said implementation the DC OCM 210 is configured to determine the noise coefficients of m basis vectors of the DC offset and the SCM 212 is configured to determine the noise coefficients of k basis vectors of the spur using techniques known in the art. The DC OCM 210 and the SCM 212 are further configured to compensate for the DC Offset and the spur respectively. It should be appreciated by those skilled in the art that though the NCM 108 has been explained in the context of removal of DC offset and spur, in other embodiments, the NCM 108 may be configured to remove any known noise, i.e., a noise whose basis vectors are known, using the same concepts elaborated above, albeit using modifications as would be apparent to those skilled in the art. On determination of the CIR, DC offset and the spur, the NCM 108 may be further configured to recover a signal substantially identical to the originally transmitted signal 106 from the received signal as has been described before in conjunction with the Equation 4, which is reproduced below for convenience.

$$r' = r - \sum_{i=0}^{m-1} h_i D_i - \sum_{i=0}^{k-1} h_{m+i} P_i \qquad \text{(Equation 4)}$$

Hence, the NCM 108 of the communication device 102 can more accurately recover the originally transmitted signal 106 from the received signal by joint estimation of the CIR, the DC offset and the spur using oblique projection. The usage of oblique projection in the joint estimation of the CIR, the DC offset and the spur by the communication device 102 reduces the computational power required, as compared to the conventional methods of computation of the CIR, the DC offset and the spur, with none or minimal affect on the accuracy. This enhances the battery life of the communication device 102 and the processing power available for running other application and utility tools on the communication device 102.

Figure 3:
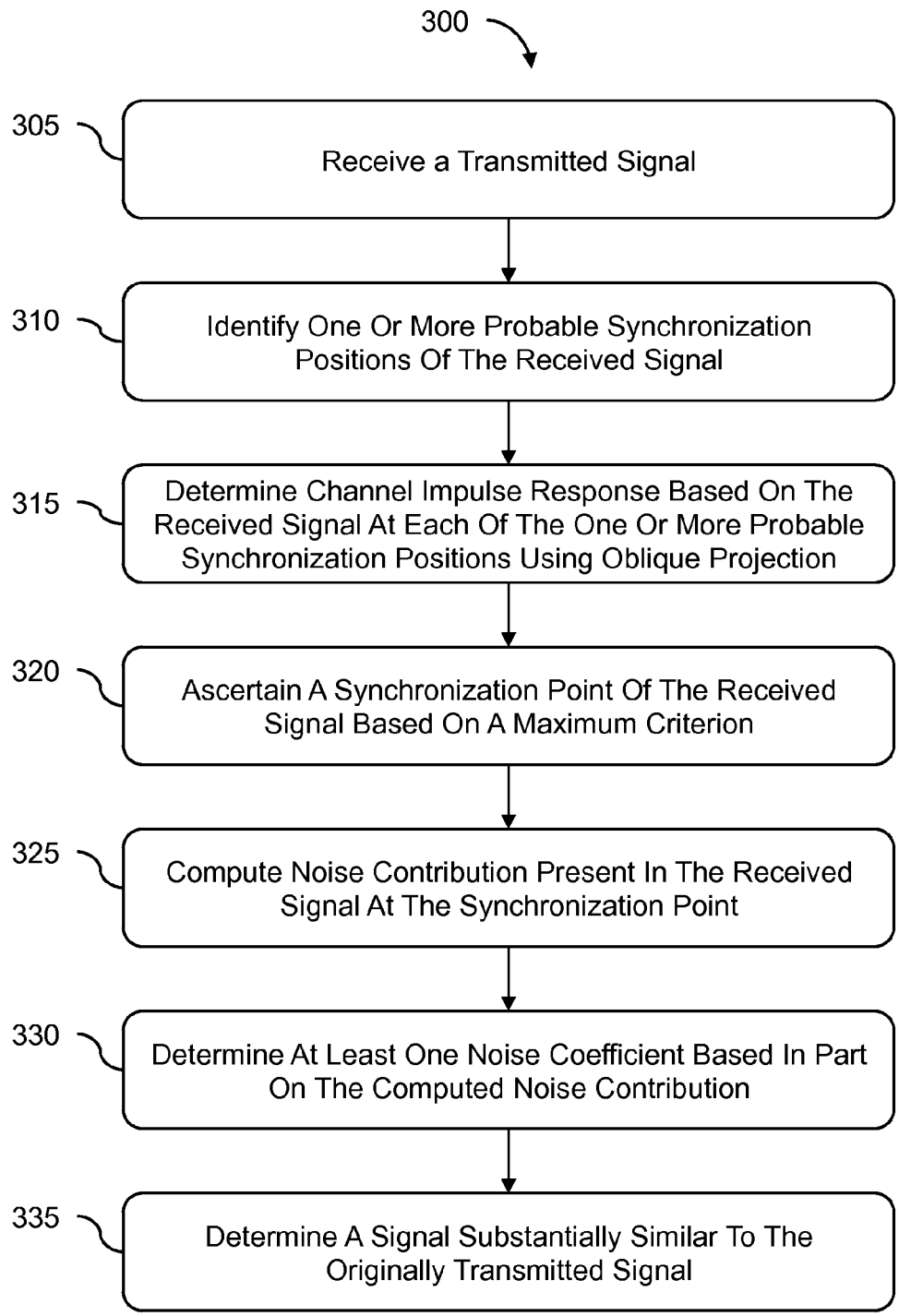
FIG. 3 illustrates a method of computing channel coefficients of a communication network using oblique projection, according to an embodiment of the present subject matter.

FIG. 3 illustrates an exemplary method 300 for processing channel coefficients in a communication device, such as the communication device 102, in accordance with an embodiment of the present subject matter. Herein, some embodiments are also intended to cover program storage devices, for example, digital data storage media, which are machine or computer readable and encode machine-executable or computer-executable programs of instructions, wherein said instructions perform some or all of the steps of the described method. The program storage devices may be, for example, digital memories, magnetic storage media such as a magnetic disks and magnetic tapes, hard drives, or optically readable digital data storage media.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

At block 305, an originally transmitted signal, such as the originally transmitted signal 106, is received by a communication device, such as the communication device 102. The originally transmitted signal 106 is seldom identical to the received signal, as the originally transmitted signal 106 suffers from addition of noise in the form of stray signals, distortions, interferences caused by operation of communication devices, the operations of the various components, of the transmitting systems or the communication device 106, such as filters, clock circuits, oscillators and amplifiers. In other words, the received signal comprises the originally transmitted signal and added noise in form of noise contribution. In one implementation, the received signal may be further processed, for example, averaged to remove a portion of the noise contribution and de-rotated for neutralizing the effect of the phase shift.

At block 310, one or more probable synchronization positions of the received signal are identified. In one implementation, the probable synchronization positions may be determined by searching for a synchronization point over a large time interval and subsequently reducing the duration of the time interval.

At block 315, the channel impulse response (CIR) is computed at the one or more probable synchronization positions of the received signal. In one implementation, the communication device 102 is configured to project, by oblique projection, as described earlier, with reference to the Equation $P=A\Omega(A^H A)^{-1}A^H$, the basis vectors depicting given noises present in the received signal onto a null space and the basis vectors depicting the signal components present in the received signal onto a signal space. The basis vectors depicting given noises include the basis vectors spanning the DC offset space, the spur space and any other known noise space. The CIR can be then computed as described earlier, using Equation 1. Thus, the coefficients of noise including the DC offset and the spur are not computed for each of the one or more probable synchronization positions, thus saving processing power as well as reducing power consumption.

As depicted in block 320, a synchronization point of the received signal is ascertained based on a criterion. In one implementation, the SM 206 is configured to designate the probable synchronization position where the signal energy of the received signal is the maximum, as the synchronization point. In another implementation, the SM 206 may be configured to designate the probable synchronization position where the noise contribution is the minimum, as the synchronization point. In yet another implementation, the synchronization point may be ascertained based on the maximum signal energy or the minimum noise contribution corresponding to one or more received branches of a SIMO receiver or a MIMO receiver. As mentioned earlier, the maximum signal energy can be indicated by the maximum CIR.

At block 325, the noise contribution present in the received signal is computed. In one implementation, the noise contribution can be computed by removing the signal component from the received signal, as described earlier using Equation 2.

As illustrated in block 330, the noise coefficients of the basis vectors of the noise contribution are computed. For example, in said implementation, the noise coefficients of DC offset, the noise coefficients of spur, and of other known noise may be computed at the synchronization position. In one implementation, the noise coefficients of the noise basis vectors present in the received signal may be computed with the help of the Equation 3 as elaborated earlier in the description. In said implementation, the DC OCM 210 is configured to compute the noise coefficients of the basis vectors of the DC offset and the SCM 212 is configured to compute the noise coefficients of the basis vectors of the spur.

As illustrated in block 335, a signal, substantially similar to the originally transmitted signal 106, is recovered from the received signal by compensating for the effect of the channel, the DC offset and the spur. In one example, the sequence of received signals is denoted by r. Based on the computed CIR, the noise contribution is determined; say by using the Equation 2. Further based on the determined noise contribution, the noise coefficients associated with the basis vectors of the noise contribution is computed using Equation 3 and the NCM 108 is configured to recover a signal, substantially similar to the originally transmitted signal 106 based on the Equation 4.

Although implementations for processing of channel coefficients of a network, in a communication device have been described in language specific to structural features and/or methods, it is to be understood that the appended claims are not necessarily limited to the specific features or methods described. Rather, the specific features and methods are disclosed as specimen implementations for processing of channel coefficients, of a network.

I claim:

1. A method of processing channel coefficients of a network, the method comprising:
   ascertaining at least one probable synchronization position of a received sequence;
   projecting the received sequence, by oblique projection, so as to project basis vectors pertaining to a signal component onto a signal space, and at least one given noise basis vector onto a null space;
   determining a channel impulse response, based on the oblique projection, at the at least one probable synchronization position;
   identifying a synchronization point for the received sequence from the at least one probable synchronization position based on a criterion related to the channel impulse response;
   determining a noise contribution at the synchronization point by removing the signal component from the received sequence;
   determining a noise coefficient of the at least one given noise basis vector at the synchronization point based on the noise contribution; and
   recovering an original signal by compensating for the at least one given noise basis vector based upon the determined noise coefficient.

2. The method as claimed in claim 1, wherein the identifying comprises determining a magnitude of signal energy indicative of the channel impulse response at each of the at least one probable synchronization position.

3. The method as claimed in claim 2, wherein the criterion is selected from a minimum noise contribution and a maximum magnitude of the signal energy.

4. The method as claimed in claim 1, wherein the given noise basis vectors correspond to at least one of DC offset and spur basis vectors.

5. The method as claimed in claim 1, wherein the method further comprises processing the received sequence, wherein the processing comprises:
   cancelling a portion of a DC offset in the received sequence by averaging to produce a first signal with the received sequence; and
   de-rotating the first signal with the received sequence by a predetermined angle based on a modulation scheme used to modulate an originally transmitted sequence.

6. A computer program product comprising a non-transitory computer readable medium, having thereon a computer program comprising program instructions, the computer program being loadable into a data-processing unit and when the computer program is run by the data-processing unit, the computer program causes the data-processing unit to:
   ascertain at least one probable synchronization position of a received sequence;
   project the received sequence, by oblique projection, so as to project basis vectors pertaining to a signal component onto a signal space, and at least one given noise basis vector onto a null space;
   determine channel impulse response, based on the oblique projection, at the at least one probable synchronization position;
   identify a synchronization point for the received sequence from the at least one probable synchronization position based on a criterion related to the channel impulse response;
   determine a noise contribution at the synchronization point by removing the signal component from the received sequence;
   determine a noise coefficient of the at least one given noise basis vector at the synchronization point based on the noise contribution; and
   recover an original signal by compensating for the at least one given noise basis vector based upon the determined noise coefficient.

7. An arrangement for processing channel coefficients, the arrangement comprising:
   a synchronization module configured to identify a synchronization point from probable synchronization positions of a received signal based on channel impulse responses at the synchronization positions, wherein the synchronization module further comprises:
   a channel estimator module configured to:
      project a signal component onto a signal space and at least one basis vector selected from DC offset basis vectors and spur basis vectors onto a null space of the received signal, by oblique projection; and
      determine a channel impulse response of a channel over which the received signal was received at the probable synchronization positions using the oblique projection.

8. The arrangement as claimed in claim 7 further comprising a noise cancellation module, wherein the noise cancellation module further comprises
   a DC offset cancellation module configured to determine noise coefficients of the DC offset basis vectors in the received signal and compensate for DC offset to produce a compensated received signal; and
   a spur cancellation module configured to determine noise coefficients of the spur basis vectors in the compensated received signal and compensate for spur.

9. The arrangement as claimed in claim 8, wherein the noise cancellation module is further configured to determine and compensate for noise contribution, denoted by at least one given noise basis vector, in the received signal.

10. The arrangement as claimed in claim 7, wherein the arrangement further comprises:
    an averaging module configured to remove a portion of a DC offset in the received signal by averaging to produce a first signal; and
    a de-rotation module configured to de-rotate the first signal by a predetermined angle based on a modulation scheme used to modulate an originally transmitted signal.

11. A communication device comprising the arrangement as claimed in claim 7.

* * * * *